Figure 3:
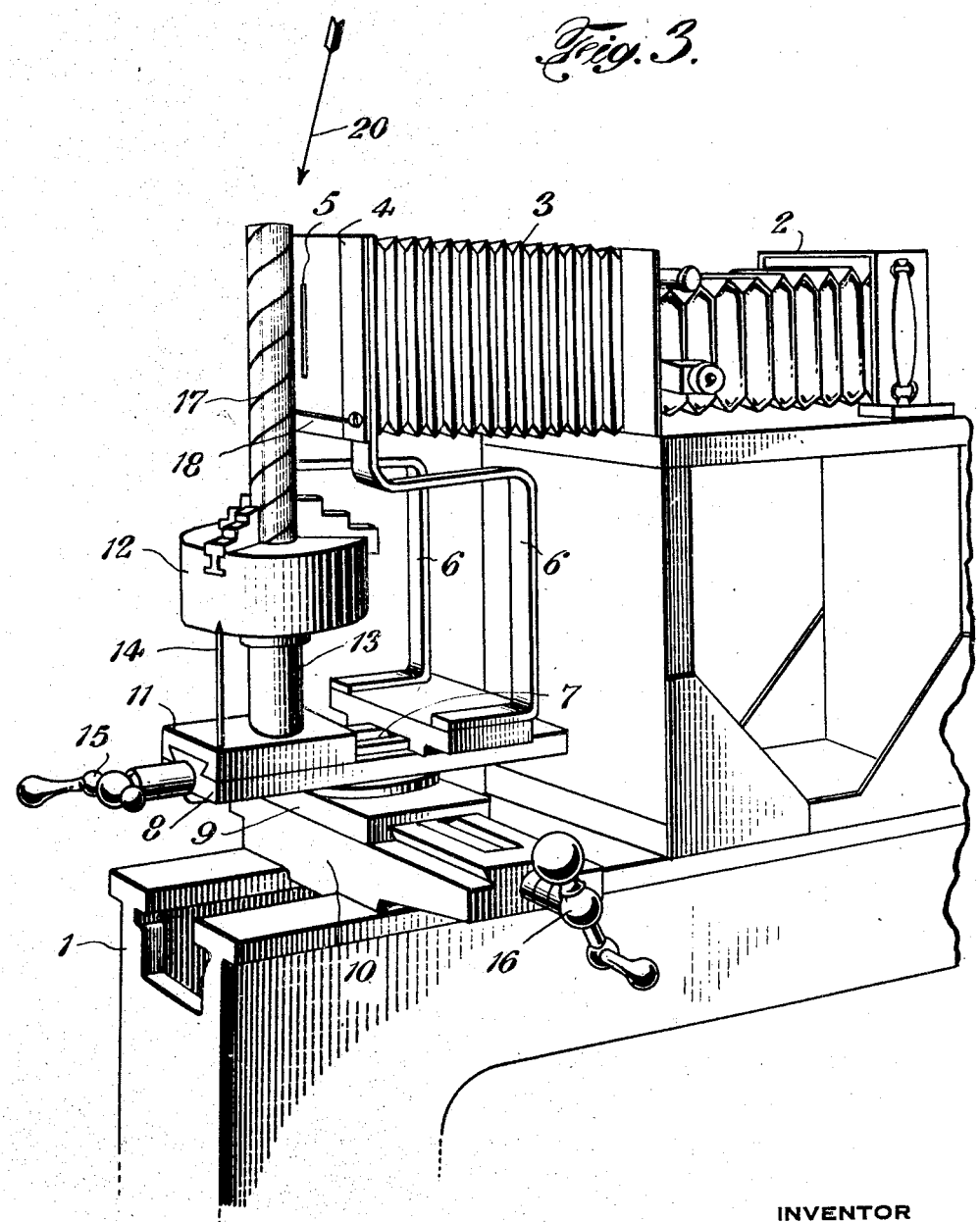

Aug. 19, 1947.  W. P. FOSTER  2,425,929
METHOD OF AND APPARATUS FOR PREPARING PHOTOGRAPHIC OVERLAY CHART
Filed Nov. 3, 1944  2 Sheets-Sheet 1
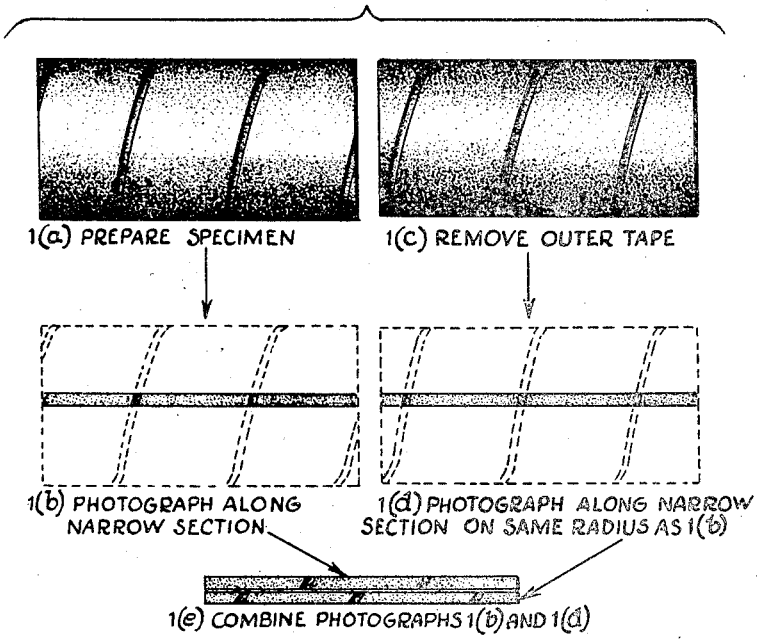
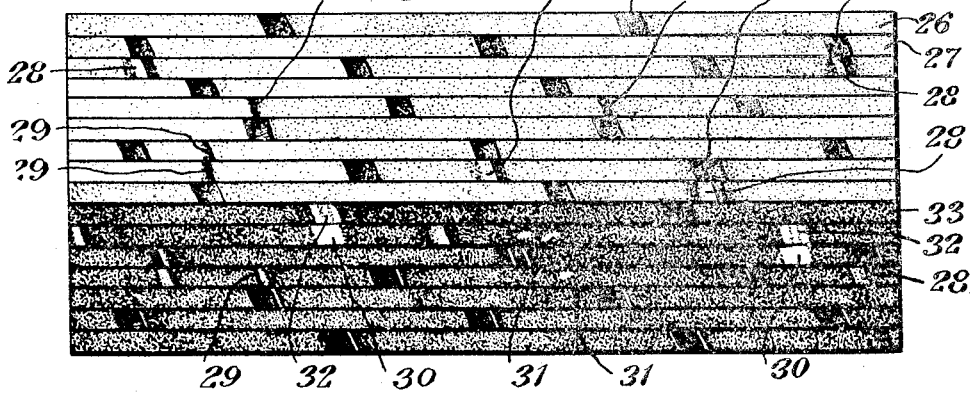
INVENTOR
William P. Foster
BY
George J. Schlotter
ATTORNEY Aug. 19, 1947.   W. P. FOSTER   2,425,929
METHOD OF AND APPARATUS FOR PREPARING PHOTOGRAPHIC OVERLAY CHART
Filed Nov. 3, 1944   2 Sheets-Sheet 2

INVENTOR
William P. Foster
BY
George J. Dehottlan
ATTORNEY

Patented Aug. 19, 1947

2,425,929

UNITED STATES PATENT OFFICE 2,425,929

METHOD OF AND APPARATUS FOR PREPARING PHOTOGRAPHIC OVERLAY CHART

William P. Foster, Jersey City, N. J., assignor to General Cable Corporation, New York, N. Y., a corporation of New Jersey Application November 3, 1944, Serial No. 561,717

7 Claims. (Cl. 88—24)

1

The present invention relates to a method of examining and recording the internal structural characteristics of paper insulated cable used in the transmission of electrical energy and other cable of similar construction, and to apparatus for carrying out the method.

The principal object of the invention is to provide method and apparatus whereby a specimen of cable, taken from a length of cable before or after it has been put into service, may be accurately and expeditiously analyzed and studied to determine structural characteristics and the effect of operation thereon. A further object is to provide a permanent record of structural characteristics which will be helpful in controlling manufacturing operations, improving the electrical properties of the cable or determining and correcting causes of failure in service.

Paper insulated cables, particularly high tension power cables, embody in their construction a number of layers of paper tape spirally wound upon a central conducting core. Such paper insulation is usually impregnated with one or another of various types of oils or greases to increase the dielectric strength of the cable. Sometimes different types of paper are used in successive layers within a single cable. In other constructions, tapes of other material, for example varnished cloth, are substituted for the paper tape in whole or in part. In all constructions it is of great importance that each tape be laid so that the valleys between turns will not register with those of adjoining tapes. It is also important that each tape be laid smoothly without wrinkles or breaks.

In order to control manufacturing operations or to determine causes of failure when they occur, it has heretofore been customary to take a short specimen length of cable, remove the sheath, extract the insulating oil or other compound if the tapes are of paper, and then unwrap the tapes layer by layer, observing, measuring and recording the position and condition of each tape before it is removed. Customarily a chart, called an overlay chart, is constructed to record graphically the data thus secured. This is a slow and laborious procedure and the accuracy of the results depends entirely upon the skill and care of the individual making the examination.

The present invention contemplates the recording in permanent form of the overlay pattern of tape insulated power cable through the use of photography. It permits the production of an overlay chart directly from the cable without the need of intermediate measurements. It eliminates the possibility of error in the customary procedure, and it enables an overlay chart to be prepared in a much shorter period of time than has heretofore been required.

2

The invention will be described by reference to the accompanying drawings wherein Figure 1 is a diagrammatic illustration of the method;

Figure 2 is a reproduction of a portion of a typical overlay chart prepared according to the method; and Figure 3 is a perspective view of apparatus for carrying out the method.

The method of this invention will first be explained in general terms by reference to Figure 1 of the drawings. At the upper left a short length of cable which is to be subjected to examination is depicted at $1a$. If a strong light is directed on to the surface of this length of cable so that the light rays impinge thereon substantially in the plane of and at an acute angle to the axis of the cable, any irregularity in the surface will cast a shadow and delineate the contours of the surface as viewed along a line at right angles to the cable axis. If a photograph is taken of the piece of cable thus illuminated the valleys between turns of the exposed tape will appear along with other surface irregularities.

The first step in the present method is to take such a photograph of a long, narrow strip of the tape surface thus exposed. This may be done conveniently through a slit in a light shield placed fairly close to the cable. At the left of Figure 1 the part of diagram marked $1b$ illustrates the taking of such a photograph as described above and the positive image which may be obtained by the exposure of a suitable film or plate.

The upper right hand portion of Figure 1 marked $1c$ illustrates the specimen shown at $1a$ with the exposed outer tape of $1a$ removed. In the manner previously described, the same photographic plate or film is exposed as indicated in part $1d$ of Figure 1 so as to record an image of the second tape on the plate immediately adjacent the first image and eventually produce the positive print illustrated at $1d$.

If these two images on the exposed plate were developed and printed they would produce a positive photograph illustrated by part $1e$ of Figure 1, and these two elements on the same film would show, as indicated at $1e$, the relative locations of the valleys between turns of tape in adjoining layers and other characteristics of the tape.

If instead of developing and printing the film or plate after the first two exposures, the procedure of photographing successive layers is repeated, the resulting photographic negative will give a record of each tape as it was positioned in the cable specimen. Such a photographic record is shown in part in Figure 2 of the drawings.

Suitable apparatus by which the foregoing method may be carried out is illustrated in Figure 3 of the drawings. Mounted on a suitable bed $1$ is a camera 2 with its lens opening into one end of the light tight bellows 3. The other end of the bellows 3 is attached to a plate 4 which has a narrow vertical slit 5 therein. Means are provided by which the image of an object seen through the slit 5 may be formed at different selected positions on the sensitized plate within the camera, as by relative movement of the plate 4 and the sensitized plate in their respective planes. As herein illustrated the plate 4 is mounted in a frame 6 for movement in a plane parallel to that of the sensitized plate within the camera. The frame 6 is rigidly attached to the rails 7 of a conventional lathe toolholder 8, which in turn is mounted upon the movable part 9 of a conventional lathe cross-slide 10 attached rigidly to the main support 1. The movable part 11 of the toolholder 8 carries a chuck 12 which is rotatably mounted on the spindle 13. An indexing pointer 14 is provided to determine the position of the chuck. A conventional feed screw, operated by the handle 15, permits the chuck to be moved toward and away from the plane of the plate 4 in a plane at right angles thereto, while another conventional feed screw operated by the handle 16 permits the entire camera, to be moved in a plane parallel to that of the camera plate.

A specimen 17 of cable to be examined is mounted in the chuck 12 and by movement of the feed screw 15 is moved into position in front of the slot 5 in the plate 4. This position is determined by an abutment 18 comprising a bar or heavy wire in front of the face of the plate 4 and against which the cable specimen rests.

A suitable light source, indicated by the arrow 20, is arranged to illuminate the surface of the cable specimen immediately adjacent the slit 5 in the plate 4, preferably by directing rays of light substantially in the axial plane of the cable at an acute angle to the axis.

The manipulation of the apparatus just described in order to carry out the method previously set forth may proceed in the following manner. A specimen of cable is selected and the oil or other insulating compound extracted to a reasonably thorough degree. The cable sheath having been removed, the specimen 17 is mounted in the chuck 12 so that its axis is in the plane of the slot 5 and in a plane parallel to that of the slotted plate 4. By manipulation of the crank 15 the cable specimen is moved toward the plate 4 until it touches the abutment 18. The angular position of the chuck 12 is now noted by suitably marking the same in line with the index pointer 14. The light source is now adjusted so that the long narrow area of the cable surface which can be viewed through the slot 5 is strongly illuminated.

When these adjustments have been made the cable is focused on a ground glass in the camera. The image appearing thereon will be a narrow, vertical strip such as that illustrated at 1b in Figure 1. With the ground glass still in place the cross feed handle 16 is turned until the image of the cable is at one side of the field of the camera. The width of the image is carefully noted and the cross feed calibrated so that the operator will know to what extent the feed screw must be turned in order to move the image on the ground glass a distance slightly exceeding the width of the image. The width of the image will be controlled by the width of the slot 5 in the plate 4, which conveniently may be about 3/64 of an inch. Using a camera which permits formation of an image only slightly smaller than the object, the width of the image on the ground glass may be about 1/16 of an inch.

When these adjustments have been made, the shutter may be closed and set, the ground glass removed, and a sensitized plate or cut film loaded into the camera. Thereupon the first exposure may be made after suitable shutter and diaphragm adjustments.

Preparations may now be made for the second photograph in the following manner. By manipulation of the feed screw 15 the cable specimen is moved away from the slit 5 and one tape removed therefrom. The specimen is moved back again to the abutment with the index pointer 14 on the marked point of the chuck, and the shutter of the camera is re-set. Before taking the second picture the cross feed screw 16 is turned to the previously noted extent to give the necessary spacing between the first and second exposures as they will appear upon the sensitized plate. The second exposure may now be made.

The foregoing procedure may be repeated for each successive layer of tape to the extent of as many tapes as are to be photographed, or to the extent of the capacity of the sensitized plate to receive images thereof.

When the negative produced in the manner just described has been developed, a positive print made therefrom will have the appearance of Figure 2 which is an illustration of a part of such a photograph or overlay chart made from an actual specimen of paper insulated cable by the method and apparatus hereinabove described. This composite photograph gives the appearance of a longitudinal section of the cable insulation but obviously it is not. It is a photographic overlay chart recording the surface appearance of a narrow longitudinal strip of each successive layer of tape comprising the cable insulation and on the same radius throughout the cable. The valleys in the tape structure are clearly indicated, for example at 25, and the relative positions of these valleys in adjoining layers, for example valley 25 in layer 26 and valley 25 in layer 27.

Other structural characteristics of the cable will also appear to the trained and experienced eye. For example, if there should be a wrinkle in any of the tapes it will show in the chart with a light-shadow pattern opposite from that due to the valleys. Such a wrinkle formed by the tape pressing up into a valley is indicated at 28 in Figure 2 and one formed by a tape pressing down into a valley is indicated at 29. Furthermore, the presence of wax, which is sometimes formed in insulating oil by reason of electrical stresses, will also appear. Sometimes the wax completely fills a valley. This obliterates shadows in the valley but records as a lighter tone as shown at 32 in Figure 2. Usually the wax remains when the tape is removed, forming a ridge on the underlying tape. This ridge is extremely light in tone because of the better lighting received. Ridges are indicated in conjunction with filled valleys 32 as at 30. Wax deposits between layers may also appear as indicated at 31. Thus an overlay chart prepared as herein described will indicate the extent of wax formation in a cable specimen under investigation.

The overlay chart of this invention will also indicate the character of the paper used. Oftentimes paper of different densities is used for different layers, and inasmuch as the insulating oil is not so readily extracted from dense paper as from other paper, the dense paper will appear darker in the overlay chart as indicated in Figure 2 with respect to layer 33 and other layers toward the bottom of the figure.

The method of this invention may also be used to investigate radial failures in cable insulation. A chart prepared from a specimen of such cable at the point of failure will indicate the surface condition of each successive layer at that point. Figure 2 does not illustrate the appearance of any such failures.

From the foregoing it will be understood that the present invention provides a simple and easily workable method of preparing an accurate overlay chart of a paper insulated cable or other cable of similar construction, as well as apparatus by which the method can be carried out. The invention may be variously embodied and modified within the scope of the subjoined claims.

I claim:

1. The method of preparing a photographic overlay chart of the structural characteristics of tape insulated cable comprising the steps of illuminating the surface of the cable insulation by directing rays of light longitudinally along the cable surface at an acute angle to the surface so as to disclose surface irregularities by the casting of shadows, photographing successively a relatively long and narrow portion of the surface of each layer of insulation on a common radius and arranging the said photographs side by side on a single print so as to give the appearance of a longitudinal section of the cable insulation.

2. The method of preparing a photographic overlay chart of the structural characteristics of tape insulated cable comprising the steps of illuminating the surface of the cable insulation by directing rays of light longitudinally along the cable surface at an acute angle to the surface so as to disclose surface irregularities by the casting of shadows, photographing a relatively long and narrow portion of one layer of tape, removing said layer, photographing on an adjacent part of the same sensitized plate a like portion of the underlying layer in radial alignment with the first portion, repeating the stated procedure until images of any desired number of layers have been made side by side on the sensitized plate so as to give the appearance, in a print made from the sensitized plate, of a longitudinal section of the cable insulation, developing the plate and preparing a print therefrom.

3. The method of preparing a photographic overlay chart of the structural characteristics of tape insulated cable comprising the steps of illuminating the surface of the cable insulation by directing rays of light longitudinally along the cable surface at an acute angle to the surface so as to disclose surface irregularities by the casting of shadows, photographing a relatively long and narrow portion of one layer of tape, removing said layer, photographing on an adjacent part of the same sensitized plate a like portion of the underlying layer in radial alignment with the first portion, repeating the stated procedure until an image of a long narrow portion of each layer of a selected group of successive layers have been made on the sensitized plate, so as to give the appearance, in a print made from the sensitized plate, of a longitudinal section of the cable insulation, developing the plate and preparing a print therefrom.

4. Apparatus for producing a photographic overlay chart of the structural characteristics of tape insulated cable comprising, in combination, a slotted plate defining a limited portion of the surface of the cable to be photographed, means to hold a cable specimen a predetermined distance in front of said slotted plate, means permitting angular adjustment of said holding means and movement thereof toward and away from said slotted plate, a camera having a sensitized plate spaced in back of said slotted plate and arranged for photographing the cable specimen repeatedly through the slotted plate and means for effecting relative movement between the slotted plate and the sensitized plate in a direction transverse to the axis of the camera for producing a plurality of images of the cable specimen side by side on the sensitized plate.

5. Apparatus for producing a photographic overlay chart of the structural characteristics of tape insulated cable comprising, in combination, a slotted plate defining a limited portion of the surface of the cable to be photographed, means to hold a cable specimen a predetermined distance in front of said slotted plate, means permitting angular adjustment of said holding means and movement thereof toward and away from said slotted plate, a camera having a sensitized plate arranged for photographing the cable specimen repeatedly through the slotted plate, and means for effecting relative incremental movement in parallel planes of the cable specimen along with the slotted plate and the sensitized camera plate for producing a plurality of images of the cable specimen side by side on the sensitized plate.

6. Apparatus for producing a photographic overlay chart of the structural characteristics of tape insulated cable comprising, in combination, a slotted plate defining a limited portion of the surface of the cable to be photographed, means to hold a cable specimen a predetermined distance in front of said slotted plate, means permitting angular adjustment of said holding means and movement thereof toward and away from said slotted plate, a camera having a sensitized plate arranged for photographing the cable specimen repeatedly through the slotted plate, and means for moving the cable specimen and slotted plate in planes parallel to the plane of sensitized camera plate.

7. The method of preparing a photographic overlay chart of the structural characteristics of tape insulated cable comprising the steps of illuminating the surface of the cable insulation by directing rays of light substantially in the axial plane of the cable at an acute angle to the axis, photographing successively a relatively long and narrow portion of the surface of each layer of insulation on a common radius and arranging the said photographs to appear side by side on a single print.

WILLIAM P. FOSTER.

REFERENCES CITED

The following references are of record in the file of this patent:

UNITED STATES PATENTS

| Number | Name | Date |
| --- | --- | --- |
| 1,169,843 | Low | Feb. 1, 1916 |

OTHER REFERENCES

"A Special Camera for Photographing Cylindrical Surfaces," 1925, by Davis, Bur. of Stds., paper 517. (Copy in Division 7.)